United States Patent [19]
Piotrowski

[11] Patent Number: 6,027,325
[45] Date of Patent: Feb. 22, 2000

[54] MACHINES FOR MANUFACTURING HOLLOW OBJECTS IN THERMOPLASTIC MATERIALS

[76] Inventor: Tadeusz W. Piotrowski, 48, Chausee de l'Etang, 94160, Saint-Mande, France

[21] Appl. No.: 09/038,253

[22] Filed: Mar. 10, 1998

[30] Foreign Application Priority Data

Mar. 11, 1997 [FR] France .................................. 97 02851

[51] Int. Cl.[7] .............................. B29C 49/48; B29C 49/58
[52] U.S. Cl. ...................... 425/192 R; 425/533; 425/535
[58] Field of Search ..................................... 425/533–535, 425/192 R, 190, 130; 264/500, 537, 539, 549, 550

[56] References Cited

U.S. PATENT DOCUMENTS

| | | |
|---|---|---|
| 3,412,186 | 11/1968 | Piotrowski . |
| 3,865,530 | 2/1975 | Jessealllee et al. ...................... 425/533 |
| 4,086,315 | 4/1978 | Piotrowski . |
| 4,309,380 | 1/1982 | Sauer ....................................... 425/533 |
| 4,668,177 | 5/1987 | Gatti ......................................... 425/535 |

FOREIGN PATENT DOCUMENTS

| | | | |
|---|---|---|---|
| 1196867 | 11/1959 | France ................................... 264/537 |
| 411318 | 11/1966 | Switzerland ........................... 425/533 |

*Primary Examiner*—Catherine Timm
*Attorney, Agent, or Firm*—St. Onge Steward Johnston & Reens LLC

[57] ABSTRACT

A mandrel assembly for use in shaping and injection molds, the assembly includes a support having compressed air channels, and a mandrel extending upwardly from the support and having spaced-apart ramps extending radially outwardly therefrom. A cap slidingly fits over the mandrel and has a free end positioned over the compressed air channels of the support. The cap also has an inner groove loosely receiving the ramps of the mandrel such that the cap is secured to the mandrel yet is able to slide up and down on the mandrel such that the free end of the cap will cover and uncover the channels. According to another embodiment of the present invention, the mandrel has an outer groove, and a plurality of balls are received in the outer groove. The cap has an inner groove corresponding to the outer groove that loosely receives the balls such that the cap is secured to the mandrel yet is able to slide up and down on the mandrel such that the free end of the cap will cover and uncover the channels.

4 Claims, 2 Drawing Sheets

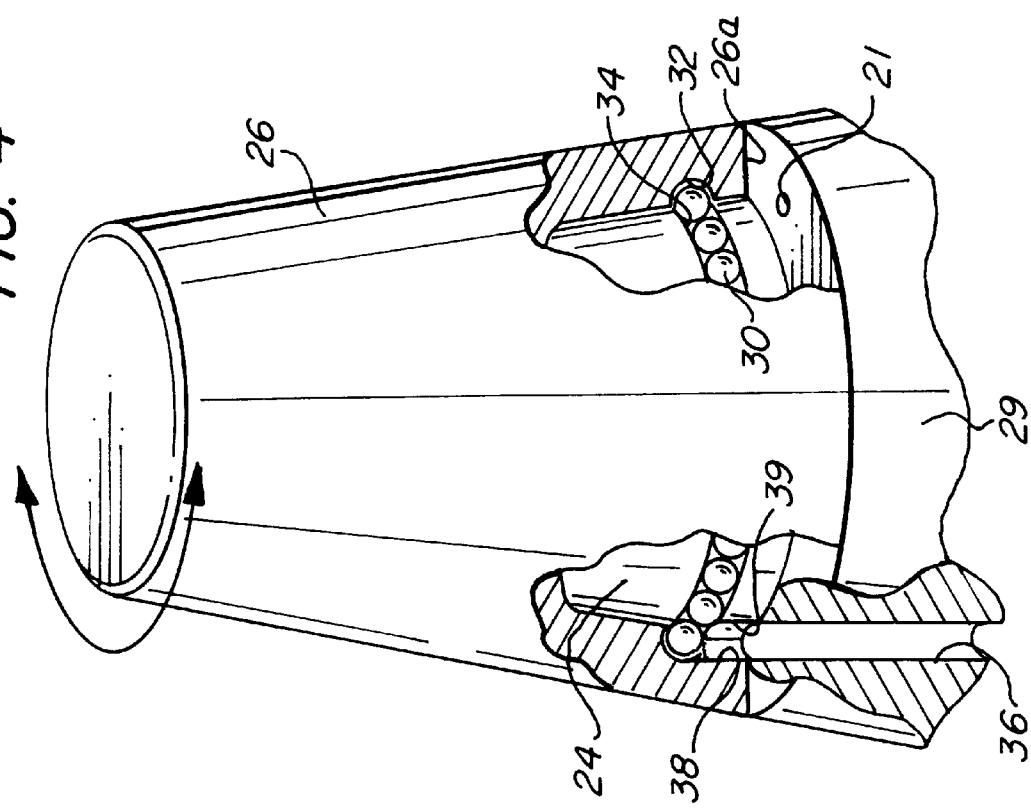
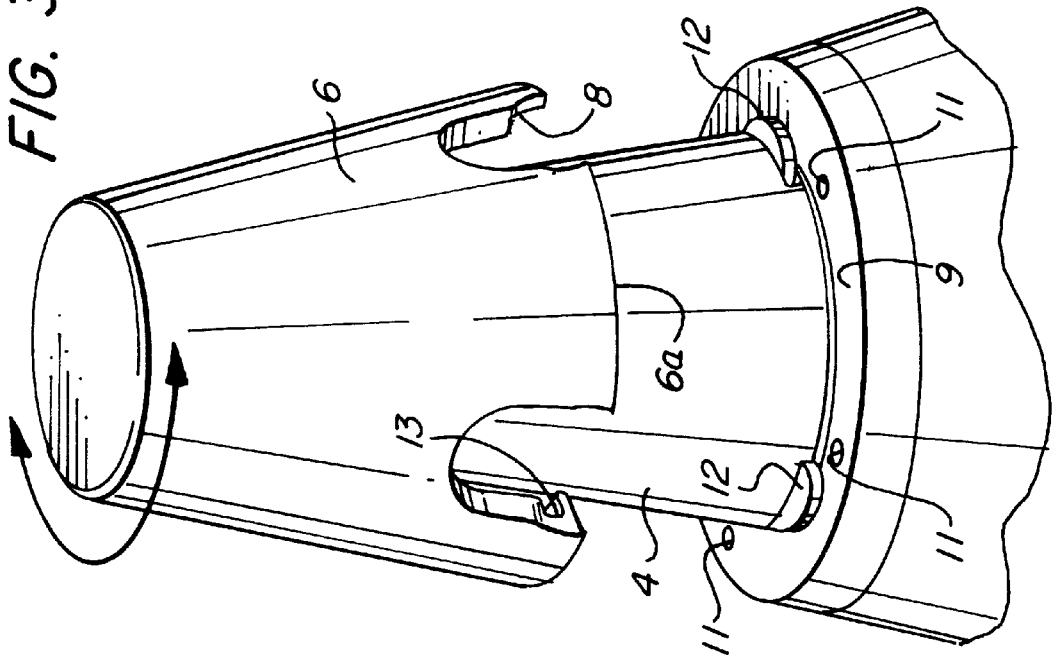

MACHINES FOR MANUFACTURING HOLLOW OBJECTS IN THERMOPLASTIC MATERIALS

RELATED APPLICATIONS

The present application claims priority based upon French Patent Application Number 9702851, filed Mar. 11, 1997.

FIELD OF THE INVENTION

The invention relates to improvements in machines for manufacturing hollow objects in thermoplastic material. More particularly, the present invention relates to a mandrel for use in thermoplastic injection and shaping molds.

BACKGROUND OF THE INVENTION

The invention is directed toward machines that consist in an injection mold with a mandrel on which the plastic material in paste consistency is deposited, the mandrel being released from the injection mold and inserted into a shaping mold into which compressed air is sent so that the plastic material is applied on the internal surface of this mold.

Generally, these machines consist in series of injection molds and series of shaping molds, and are constructed in such a manner that the shaping is done at the time of injection, and vice versa.

The passageway provided for the compressed air at the time of shaping must be very small in size, and it has been found that regardless of the care taken the air could always carry impurities that can obstruct said passageway. In this case, cleaning that is very complex and lengthy and immobilizing the machine for a lengthy period of time must be done.

What is desired therefore is a mandrel assembly having means for closing the compressed air passageways during the injection molding process, yet allowing the passageways to open during the shaping mold process.

SUMMARY OF THE INVENTION

Accordingly, it is an object of the present invention to provide a mandrel assembly having means for closing the compressed air passageways during the injection molding process, yet allowing the passageways to open during the shaping mold process.

These and other objects of the present invention, are solved by a mandrel assembly for use in shaping and injection molds. The assembly includes a support having compressed air channels, and a mandrel extending upwardly from the support and having spaced-apart ramps extending radially outwardly therefrom. A cap fits over the mandrel and has a free end positioned over the compressed air channels of the support. The cap also has an inner groove loosely receiving the ramps of the mandrel such that the cap is secured to the mandrel yet is able to slide up and down on the mandrel, such that the free end of the cap will cover and uncover the channels.

The present invention also provides another mandrel assembly for use in shaping and injection molds. The assembly includes a support having compressed air channels, and a mandrel extending upwardly from the support and having an outer groove. A plurality of balls are received in the outer groove. The assembly also includes a cap fitting over the mandrel and having a free end positioned over the compressed air channels of the support. The cap has an inner groove corresponding to the outer groove of the mandrel, with the outer groove loosely receiving the balls such that the cap is secured to the mandrel yet is able to slide up and down on the mandrel such that the free end of the cap will cover and uncover the channels.

The invention will now be described in greater detail by referring to a particular mode of embodiment given merely as an example and depicted in the annexed drawings.

BRIEF DESCRIPTION OF THE DRAWINGS

FIG. 3 is a schematic top view of a detail, and FIG. 4 is a schematic top view, partially cut away, of another mandrel assembly according to the present invention.

DETAILED DESCRIPTION OF THE INVENTION

Figure 1:
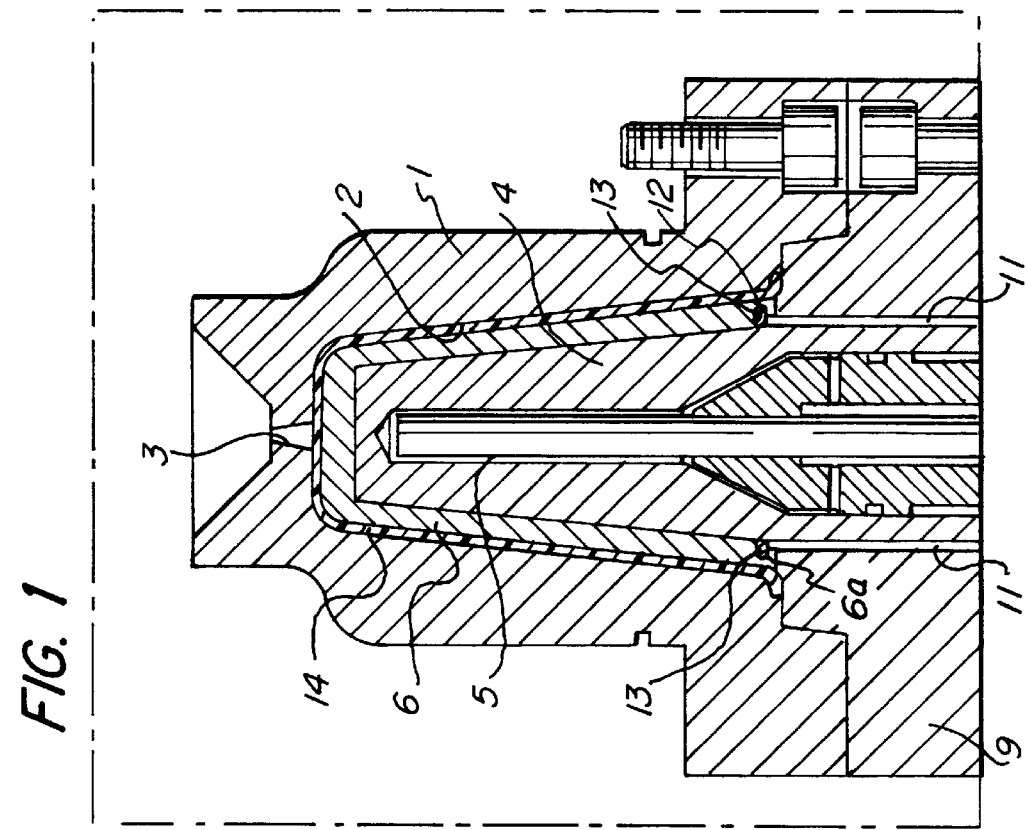
FIG. 1 is a schematic cross-section showing the injection portion of the machine.

In FIG. 1, an injection mold consisting of a body 1 with a cavity 2 into the bottom of which an injection hole 3 empties has been represented. In the cavity 2 there is a mandrel 4 that has a central bore 5 in which a heating fluid, for example oil, circulates.

According to the invention, the lateral surface of the mandrel 4 is in two parts that fit into each other. The external portion is formed by a cap 6 that has at its free end 6a notches 8 extended by internal grooves 13 that work together with ramps 12 of a mandrel support 9. The cap 6 is very thin and is made of a material that is a good conductor of heat.

The cap 6 must be pivoted, or turned, slightly for final assembly after the grooves 13 have been engaged under the ramps 12. This creates a simple and rapid bayonet assembly. Reference number 14 designates the plastic material that is injected into the space between the mold and the mandrel 4.

In the support 9 are channels 11 designed to conduct the compressed air intended for the shaping.

The channels end opposite the free end 6a of cap 6, the latter being mounted with a very slight play so that it can shift axially to permit passage of air. In other words, the grooves are loosely fitted on the ramps, such that the cap is free to move slightly up and down to respectively uncover and cover the compressed air channels. Thus during molding the channels 11 are closed, while during shaping the compressed air can pass between end 6a and support 9.

Support 9 is mounted movably so that it can move mandrel 4 from injection mold 2 toward shaping mold 5 and vice versa.

Figure 2:
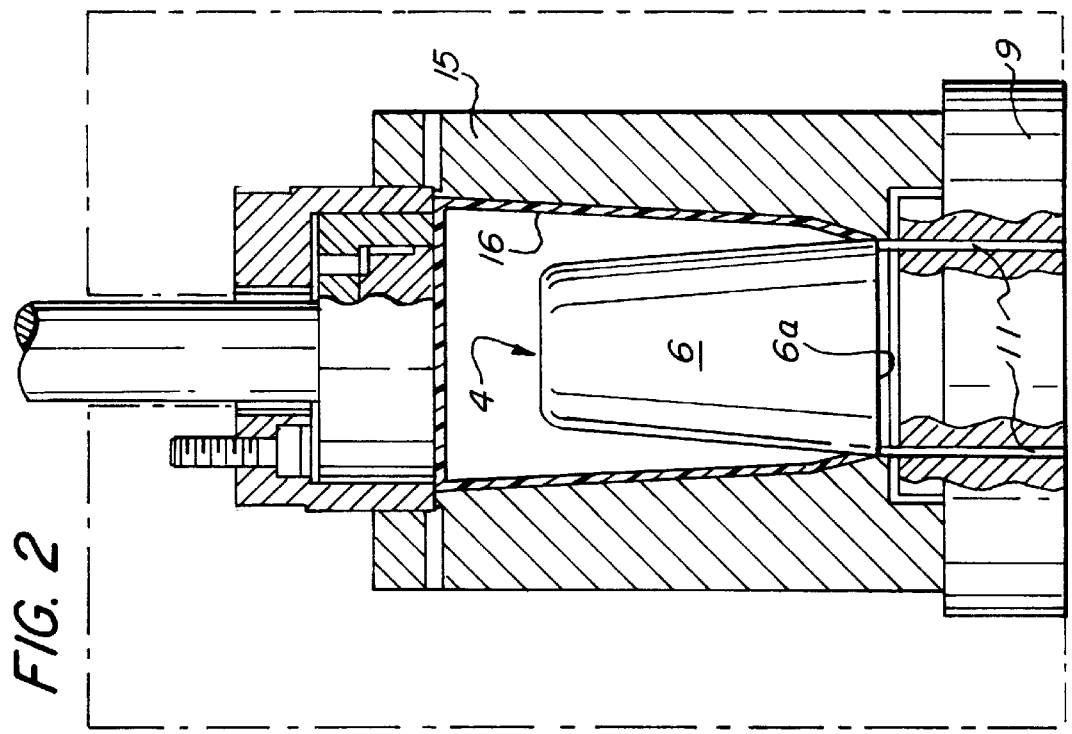
FIG. 2 is a schematic cross-section showing the shaping portion of the machine.

As can be seen in FIG. 2, mandrel 4 with its cap 6 after injection and with the thermoplastic material 14 resting on it is placed in the shaping mold 15 and compressed air is sent through channels 11. This compressed air passes through the slight play created between end 6a and support 9 so that the thermoplastic material that coated mandrel 4 is applied against the internal surface of shaping mold 15. Needless to say, the shaping mold is then opened in known manner to release the thermoplastic material piece 16 created in known manner and the mandrel is again placed in mold 1 for a new cycle.

One can imagine how very easy it is to disassemble the external portion when cleaning is desired, as the machine does not have to be immobilized for a lengthy period.

Needless to say, the invention is not limited to the mode of embodiment just described and represented. Numerous modifications in detail can be made therein without departing from the framework of the invention.

In the mode of embodiment represented, a bayonet assembly has been depicted, but this assembly could be replaced by a retractable-ball system.

For example, referring to FIG. 4 another apparatus for use in blow and injection molds according to the present invention is shown. The apparatus includes a support having compressed air channels, and a mandrel extending upwardly from the support and having a outer groove receiving a plurality of balls. A cap slidingly fits over the mandrel and has a free end positioned over the compressed air channels of the support, and an inner groove corresponding to the outer groove of the mandrel, loosely receiving the balls. By this invention, the cap is secured to the mandrel yet is able to move up and down on the mandrel such that the free end of the cap will cover and uncover the channels. The cap 26, of course, is very thin and is made of a material that is a good conductor of heat.

Preferably, both grooves 32, 34 are continuous and circumferencially positioned on the cap 26 and the mandrel 24, respectively, parallel with the free end 26b of the cap. The support 29 includes an access port 36 for alignment with an access channel 39 on the mandrel and an access channel 38 on the cap. The access channel 39 on the mandrel is connected to the outer groove 34 of the mandrel, while the access channel 38 on the cap is connected to the inner groove 32. Once the access channels 38, 39 are aligned with the access port 36, the balls 30 may be added or removed from the inner and outer grooves 32, 34.

Preferably, the access channel 39 of the mandrel 24 is permanently aligned with the access port 36, such that only the access channel 38 of the cap 26 must be aligned with the access port to add or remove balls 30. The cap 6 is then simply pivoted, or turned, for alignment of the access channel 38 and the access port 36.

For assembly, the cap 26 is placed over mandrel 24 and turned for alignment. Then balls 30 are introduced into the access port 36 such that they run into the inner and outer grooves 32, 34. Once the grooves 32, 34 are full or at least partially full with balls 30, the cap 26 is turned to close the access port 36. When the balls 30 are within the grooves 32, 34, the cap 26 is prevented from coming off the mandrel 24. For removal of the cap 26, the cap is simply turned for alignment, and the balls 30 are allowed to run out of the access port 36. Thus, the present invention again creates a simple and rapid bayonet assembly.

The inner groove 32 of the cap 26 has a width that is greater than a diameter of the balls 30 such that the inner groove is loosely fitted on the balls. The cap 26, accordingly, is free to move slightly up and down to respectively uncover and cover the compressed air channels 21. Thus during injection molding, the channels 21 are closed, while during the shaping molding, the compressed air can pass between the free end 26a and the support 29.

Although the invention has been described with reference to a particular arrangement of parts, features and the like, these are not intended to exhaust all possible arrangements or features, and indeed many other modifications and variations will be ascertainable to those of skill in the art.

What is claimed is:

1. A mandrel assembly for use in shaping and injection molds comprising:

a support having compressed air channels;

a mandrel extending upwardly from the support and having spaced-apart ramps extending radially outwardly therefrom;

a cap slidingly fitting over said mandrel and having a free end positioned over the compressed air channels of the support, said cap having an inner groove loosely receiving the ramps of the mandrel such that said cap is secured to said mandrel yet is able to slide up and down on said mandrel such that said free end of said cap will cover and uncover said channels.

2. A mandrel assembly according to claim 1 wherein the cap further includes notches corresponding to said ramps of said mandrel, whereby said cover can be placed over said mandrel such that the notches receive the ramps, and the cap thus can be rotated until the ramps are received by the inner groove of the cap.

3. A mandrel assembly for use in shaping and injection molds comprising:

a support having compressed air channels;

a mandrel extending upwardly from the support and having an outer groove;

a plurality of balls received in the outer groove;

a cap slidingly fitting over said mandrel and having a free end positioned over the compressed air channels of the support, said cap having an inner groove corresponding to said outer groove of said mandrel, said outer groove loosely receiving said balls such that said cap is secured to said mandrel yet is able to slide up and down on said mandrel such that said free end of said cap will cover and uncover said channels.

4. A mandrel assembly according to claim 3 wherein the support further includes an access port connected to said inner and outer grooves.

* * * * *